April 25, 1933. E. WEISKER 1,905,538
APPARATUS FOR ILLUMINATING OBJECTS TO BE REPRODUCED
Filed Aug. 8, 1929 2 Sheets-Sheet 1
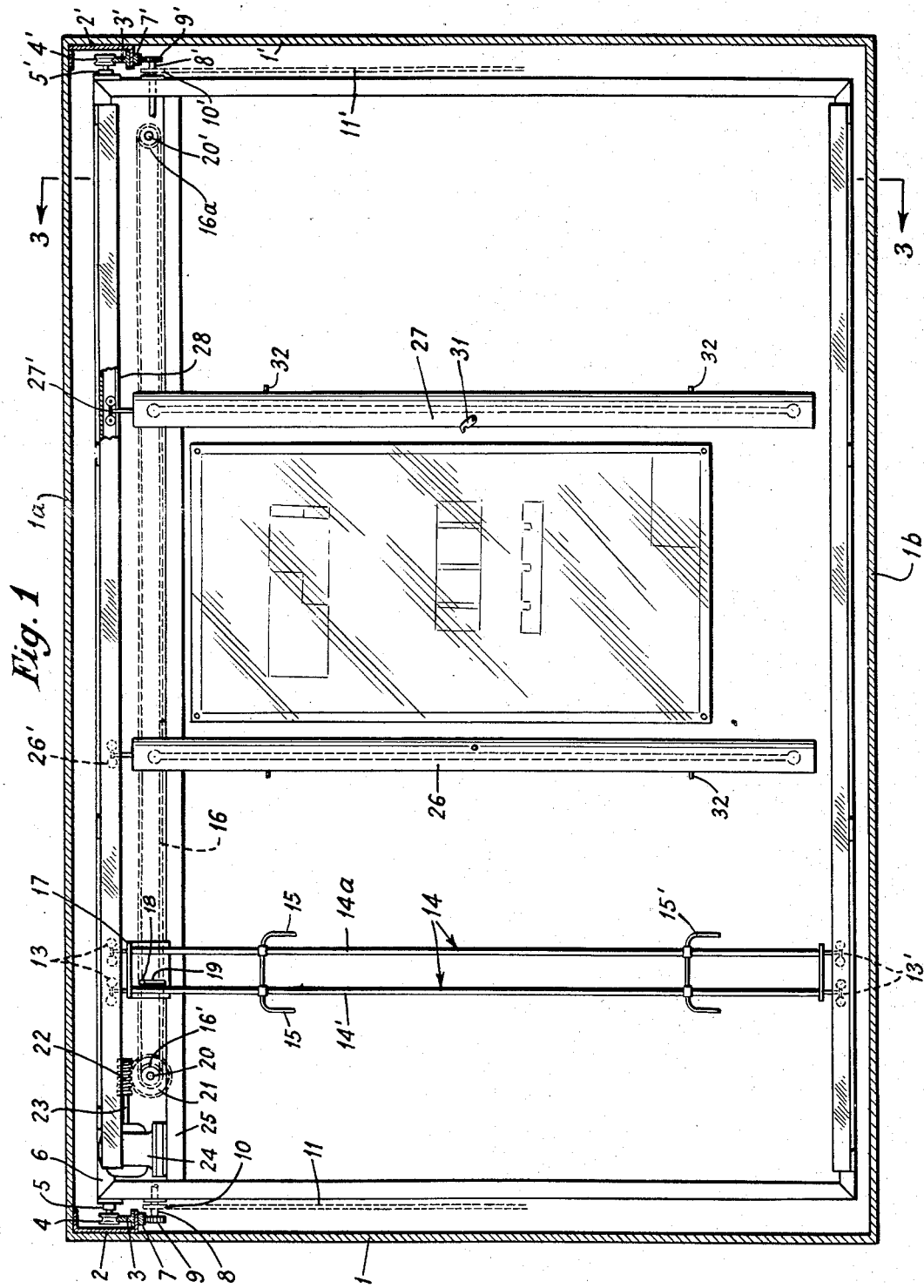
INVENTOR
Ellis Weisker
BY
Joseph F. O'Brien
ATTORNEY April 25, 1933.　　　　　E. WEISKER　　　　　1,905,538
APPARATUS FOR ILLUMINATING OBJECTS TO BE REPRODUCED
Filed Aug. 8, 1929　　　2 Sheets-Sheet 2
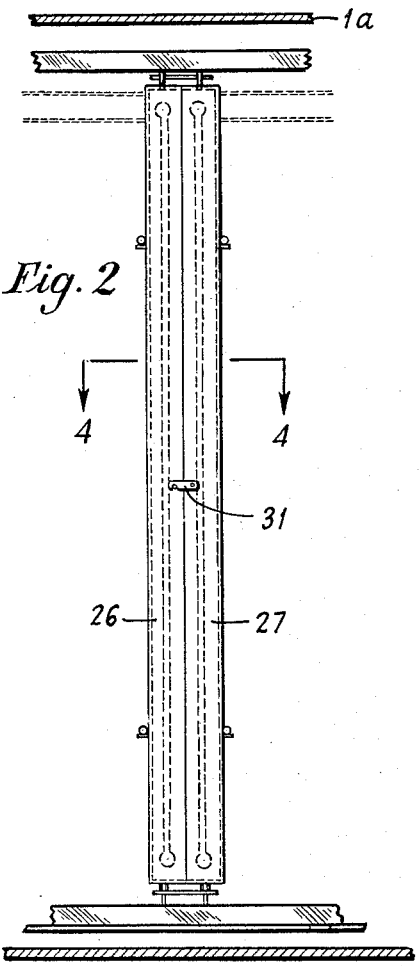
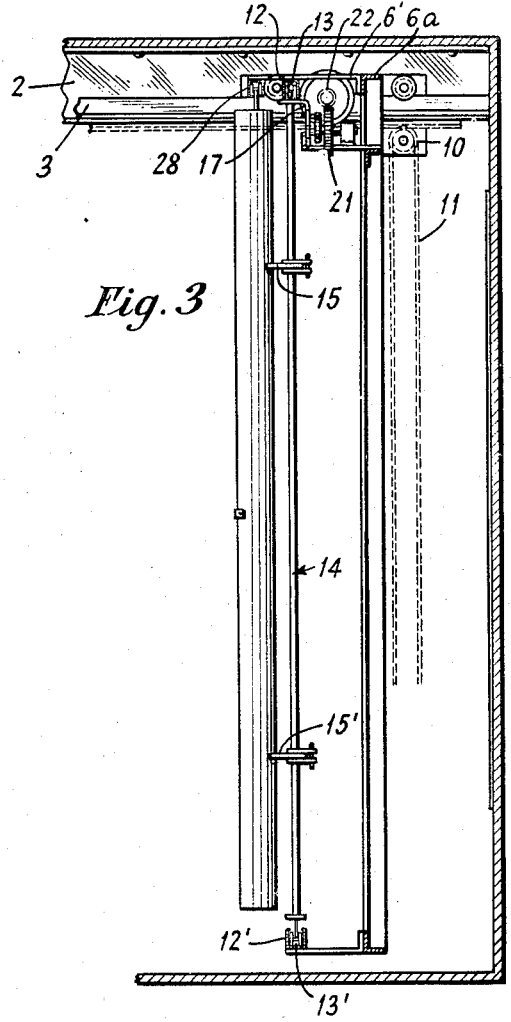
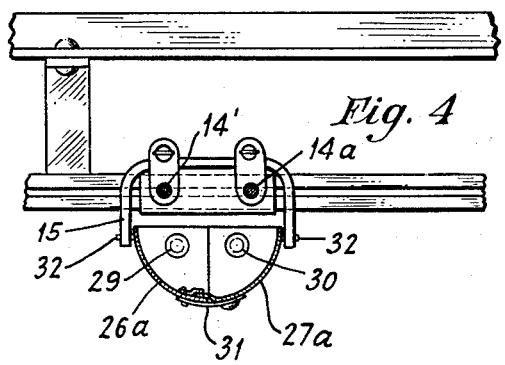
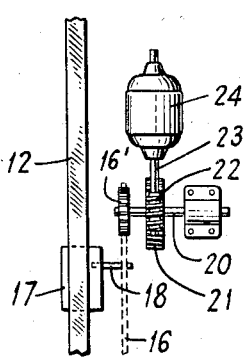
INVENTOR
Ellis Weisker
BY
Joseph F. O'Brien
ATTORNEY Patented Apr. 25, 1933

1,905,538

UNITED STATES PATENT OFFICE

ELLIS WEISKER, OF BRONX, NEW YORK

APPARATUS FOR ILLUMINATING OBJECTS TO BE REPRODUCED

Application filed August 8, 1929. Serial No. 384,445.

This invention relates to apparatus for illuminating objects to be reproduced and is an improvement upon the device shown and described in my co-pending application, Serial No. 116,789, filed June 18, 1926.

One of the objects of this invention is to provide an apparatus of the type specified which will be readily and quickly convertible so that it may be employed for reproduction of the object either by the use of a traversible illuminating element or by stationary illumination.

Another object of my invention is to provide means which will enable the traversible illuminating element thereof to be capable of effective employment for stationary illumination of the object, either for the purpose of focusing of the object or for the purpose of reproduction by the machine with stationary illumination.

Still another object of my invention is to produce apparatus in which the lamp-carrying and shading element will be readily and quickly convertible so as to serve either of the double functions of a traversible illuminating unit for use in reproduction or as suitably-positioned stationary illuminating members which may be employed in the operation of focussing the object or for the purpose of reproduction with stationary illumination.

Still another object of my invention is to provide, in a device of the character specified, a traversible illuminating element composed of a plurality of segmental parts which will be capable of being readily and quickly connected together and mounted for traverse over and across the object as a single unit for the purpose of illuminating the same during reproduction and will also be capable of separation to provide suitable stationary illumination for the operation of properly focussing the object or for reproduction with stationary illumination.

Still another object of my invention is to provide a mounting frame for said traversible illuminating element which will enable a focussing movement of the same toward and away from the copyboard as well as to enable traversing reproducing movement thereof across the copyboard in a plane which will provide the most efficient illumination.

Still another object of my invention is to provide an illuminating element composed of two separable illuminating members having coupling edges and means for mounting the same so as to cause said members to be movable laterally in the same plane and to cause interengagement or separation of said coupling edges and which will be capable of being conjointly moved toward and away from the copyboard as well as laterally in relation thereto so as to enable positioning in any suitable stationary position relatively to the object for the purpose of properly focussing the same and which members may, after the operation of focussing is completed, be readily and quickly brought together to provide a light-sealed interlocking joint and to form a single illuminating and shading unit, which unit will be capable of being traversed through the field of view and over the object for the purpose of sectionally reproducing the same.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Fig. 1 is a front elevation of lighting apparatus embodying my invention and showing the parts of my traversible illuminating element dismounted from its carrier and separated for use in focussing or providing stationary illumination for reproducing the object;

Fig. 2 is a fragmentary front elevation, showing the members of my illuminating element connected together and mounted upon the traversing carrier for use in its traversing reproducing function;

Fig. 3 is a fragmentary section on the line 3—3 of Fig. 1, showing, in side elevation, the illuminating element mounted on its carrier as illustrated in Fig. 2;

Fig. 4 is a section on the line 4—4 of Fig.

2, looking in the direction of the arrows; and Fig. 5 is an enlarged detail view of the mounting devices shown at the top of Fig. 3.

Referring now to these drawings, which illustrate a preferred embodiment of my invention, 1, 1' represent the side walls of the room and 1$^a$, 1$^b$ represent the ceiling and floor of the same respectively.

2, 2' are channel beams mounted at the upper corners of the walls 1, 1', each of the lower flanges of said channel beams having mounted thereon tracks 3, 3', on which tracks are mounted two pairs of pulleys 4, 4', and 5, 5' represent trunnions journalled in said pulleys and fastened to a frame 6, the arrangement being such as to movably support the said frame 6 upon the pulleys 4, 4' which are movable along the tracks 3, 3' which thus form a movable support for the frame 6.

The under side of the said flanges are provided with racks 7, 7' and the frame 6 has mounted thereon, by means of shafts 8, 8', a pair of pinions 9, 9'. Obviously, upon rotation of one or both of the pinions 9, 9' along the racks, the frame 6 will be caused to move along the racks 7, and, as shown, I have fixedly mounted on the shafts 8, 8', pinions 10, 10' manually operable by chains 11, 11' to turn the pinions 10, 10' and 9, 9' so as to cause a movement of the frame 6 along the racks 7, 7'.

The frame 6, as illustrated, is composed of a main frame member 6' having supported thereon a hanger track 12, located along the upper and lower rails of said main frame 6', in which hanger tracks are mounted two hangers 13, 13' which are arranged to support a lamp-carrying frame 14 having lamp-engaging arms 15, 15' and arranged to be reciprocated or traversed back and forth across the frame by means of an endless chain 16. As shown, the bars 14', 14$^a$ of the frame on which the rollers are mounted pass at their upper end through a plate 17 having the conformation of an inverted L, said plate 17 having a connection with the chain by means of a pin 18 fastened to and carried by the chain, which pin extends through a vertical slot 19 in the vertical portion of the plate 17. Obviously, upon movement of the strand or stretch of chain 16 on which the projection 18 is mounted in one direction, the carrier frame 14 will be moved in the same direction and when this projection passes around the sprocket 16', on which one end of the chain is mounted, the pin will be forced downwardly in the slot 19, while the carrier frame is retained in substantially stationary position and when this pin reaches a position on the lower stretch of the chain, the carrier will be moved in the opposite direction until it reaches the pinion or sprocket 16$^a$ at the opposite end, when a reverse movement of the pin 18 in the slot 19 will occur.

Any suitable means may be utilized for moving the chain 16 to traverse the frame 14. As illustrated, I have shown the chain sprockets 16, 16$^a$ mounted upon shafts 20, 20' and on one of these shafts is mounted a worm wheel 21 rotated by a worm 22 on a shaft 23 rotated by a motor 24 which, as illustrated, is mounted in elevated position on a supporting beam 25.

In Fig. 1, I have shown the illuminating element dismounted from the lamp-carrying frame 14. As illustrated, the illuminating element, which is traversible by the frame, is composed of two separable members 26 and 27 which are mounted independently of each other on hangers 26', 27' which are movable in a single hanger track 28 mounted at the upper end of the frame 6. These illuminating members 26 and 27, as more particularly illustrated in Fig. 4, are composed of quadrant-shaped segmental reflectors 26$^a$, 27$^a$ carrying lamps 29 and 30 respectively, said two quadrant-shaped segmental reflectors being capable of being brought together and latched by a latching member 31 as shown in Figs. 1 and 4, to form a single illuminating element of semi-circular conformation. As illustrated, the unit is provided with lateral projections 32 adapted to interengage with the arms 15, 15' of the carrier 14. As illustrated, the arms 15 are positioned over the projections and lock the carrier frame 14 to the illuminating unit so that, upon a traversing of said frame, the illuminating unit will be traversed thereby.

In the preferred form of my invention, the copyboard comprises the rear wall of the room in which the apparatus is mounted and it will be seen from the above that I have provided means whereby the lighting elements may, for the operation of focussing, be separated and its parts may be moved to any desirable stationary position laterally and may also be moved with the frame outwardly any suitable distance away from the copyboard, thus enabling a proper focussing of the object and a proper illumination thereof during such focussing, and also enabling the use of these members as stationary illuminating elements for reproducing, if desired. It will also be seen that the illuminating element is composed of two segmental quadrant-shaped parts which, after the operation of focussing, may be moved into conjunction so as to form a single semi-circular unit which may be then mounted for traversing movement across the copyboard and it will be seen that the path of this traversing movement may then be changed to procure the most intense illumination which will be best suitable for reproduction of the particular design or object to be reproduced.

It will be seen, furthermore, that the movement of the two illuminating elements away from the copyboard will, because of the fact that they are mounted on a single frame, move simultaneously and uniformly a predetermined distance from the copyboard and that I have, therefore, provided first, means for focussing objects of the character contemplated and have also provided illuminating means which may be employed as a single unit in the sectional reproduction or traversible illumination and which may, furthermore, be dismounted from the traversing carrier and are separated into two members capable of being positioned in any suitable stationary position in relation to the copyboard for the purpose of focussing or for the purpose of providing stationary illumination during reproduction.

Having described my invention, I claim:—

1. In apparatus for illuminating objects to be reproduced, an illuminating element composed of a plurality of illuminating parts, said illuminating parts having coupling edges adapted to be interengaged to form a light-sealed joint therebetween and being capable of joint traversing movement across the object to reproduce the same, said parts being also capable of independent movement to enable independent positioning thereof.

2. In apparatus for illuminating objects on a copyboard for reproduction, a frame disposed parallel to said copyboard and movable toward and away from the same, a track carried by said frame, an illuminating element composed of a plurality of illuminating parts each independently mounted on said track and independently movable thereon, a second track carried by said frame and a carriage mounted on said second track for engagement with and movement of said parts conjointly.

3. In apparatus for illuminating objects to be reproduced, an illuminating element composed of a plurality of independent lamps, a light-reflecting and shading member for all of said lamps formed of a plurality of separable parts each being capable of independently serving one of said lamps, means for movably mounting said separable parts to have movement independently of each other in the same plane for use in illuminating an object for focussing purposes, means for coupling said separable parts together, and means for conjointly moving said coupled parts across the object to reproduce the same.

4. In apparatus for illuminating objects to be reproduced, an illuminating element composed of a pair of independent lamps, a light-reflecting and shading member for all of said lamps formed of a pair of separable parts each quadrant-shaped in conformation and each being capable of independently serving one of said lamps, means for movably mounting said separable parts to have movement independently of each other in the same plane for use in illuminating an object for focussing purposes, means for coupling said separable parts together, and means for conjointly moving said coupled parts across the object to reproduce the same.

5. In apparatus for illuminating objects to be reproduced, an illuminating element composed of a plurality of independent light-producing members and a common light-reflecting member for all of said light-producing members composed of a plurality of elongated parts separable from each other along division lines parallel to the axes of said members, and each of said parts being capable of independently serving one of said separable light-producing members.

6. In apparatus for illuminating objects to be reproduced, an illuminating element composed of a plurality of independent light-producing members and a common light-reflecting member for all of said light-producing members composed of a plurality of elongated parts separable from each other along division lines parallel to the axes of said members, each of said parts being capable of independently serving one of said separable light-producing members, and means for movably mounting a separable light-producing member in conjunction with the light reflecting part which serves the same, to have movement independently of the other separable light-producing and reflecting parts.

In witness whereof, I have signed my name to the foregoing specification.

ELLIS WEISKER.